United States Patent [19]
Young

[11] 3,967,240
[45] June 29, 1976

[54] DIRECTIONAL SIGNAL
[75] Inventor: J. Ridgely Young, Edmonton, Canada
[73] Assignee: Kay Melinda Brownlee, Edmonton, Canada
[22] Filed: July 15, 1975
[21] Appl. No.: 596,152

[52] U.S. Cl. .................................. 340/73; 340/71; 340/332; 40/32
[51] Int. Cl.² ...................... B60Q 1/26; B60Q 1/34; G08B 5/00
[58] Field of Search ......... 340/332, 120, 334, 41 A, 340/321, 73, 71; 40/130, 28, 32; 315/248, 77, 76

[56] References Cited
UNITED STATES PATENTS

| 1,685,157 | 9/1928 | Goeller | 340/334 X |
| 1,784,861 | 12/1930 | Wilde | 340/334 X |
| 3,041,579 | 6/1962 | Kanzenbach | 340/73 X |
| 3,073,051 | 1/1963 | Baker et al. | 315/248 |

Primary Examiner—Donald J. Yusko
Attorney, Agent, or Firm—Dennison, Dennison, Meserole & Pollack

[57] ABSTRACT

An endless belt incorporating a pair of conductor wires mounts on a pair of spaced pulleys for travel thereabout, in either direction, in response to a motor driving of one of the pulleys. The belt mounts lamps at spaced points therealong which are in current receiving engagement with the conductor wires which in turn receive current from an appropriate source through brush engaged conductor means on the pulleys.

8 Claims, 7 Drawing Figures

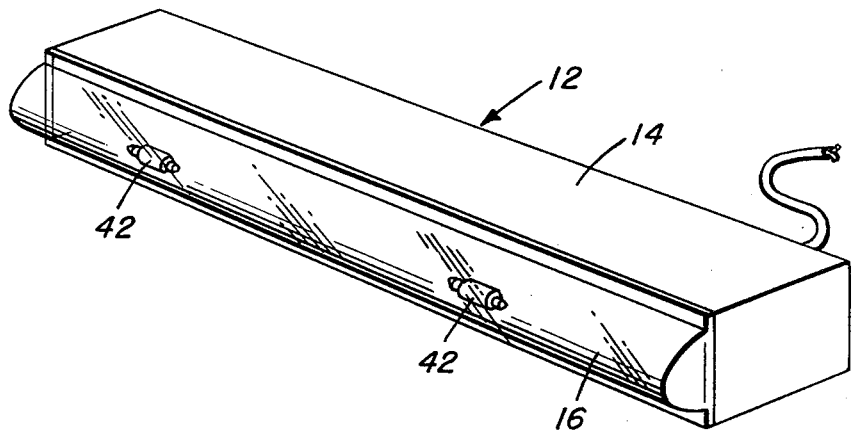
FIG. 1
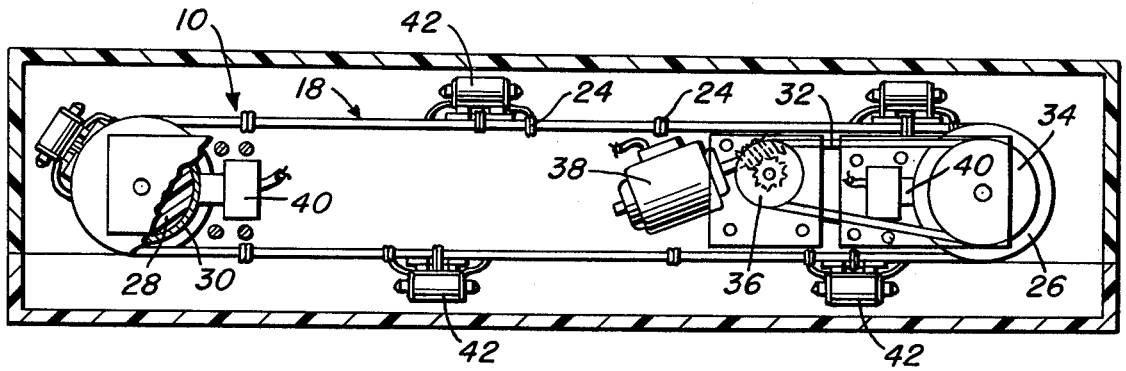
FIG. 2
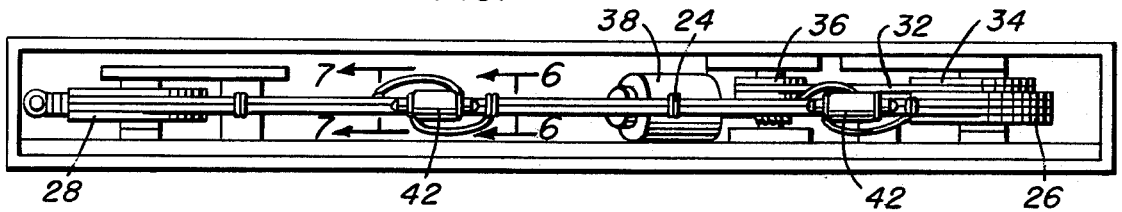
FIG. 3
FIG. 5
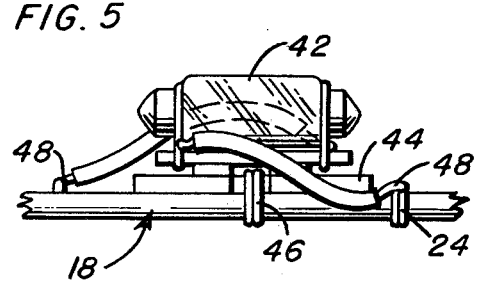

DIRECTIONAL SIGNAL

The invention is generally concerned with means for transferring electrical energy to a moving belt, and, in the preferred environment, the utilization of such an energy transfer system in a directional signal utilizing multiple continuously moving lamps.

While moving lights, or the appearance thereof, occur in known direction indicating apparatus, as exemplified by U.S. Pat. Nos. 1,831,814; 1,961,491 and 2,852,759, as well as in general light displays as exemplified by U.S. Pat. Nos. 978,130; 1,090,989 and 1,916,489, the system proposed herein is distinct in its structural particulars which better adapt it for use in a variety of different environments, including use as a directional signal.

In the illustrated preferred embodiment of the invention, the lamp carrying belt travels continuously in either of two directions or cyclically in opposite directions, controlled in each instance by an electrically powered reversible motor and appropriate actuation means associated therewith. The belt mounts individual lamps which travel therewith and are continuously lit during travel of the belt so as to provide a positive and highly distinct warning or direction indication.

The directional signal system, normally to be used in conjunction with automobiles, trucks, buses, emergency vehicles, and the like, as well as fixed location traffic indicators, will preferably be incorporated into a compact elongated casing or housing adapted to provide, through a transparent or translucent elongated cap, a visible although protected display of the traveling lights. When used in a motor vehicle, the device will normally be powered directly from the vehicle battery with the direction of movement of the lamp carrying belt controlled in the manner of conventional turn signals utilizing appropriate switch means. If so desired, in addition to use of the device as a turn signal, a brake sensing device can, through well known means, be utilized to cyclically or reciprocally move the lamp carrying belt to provide a highly distinctive and attention attracting warning signal.

Other objects and advantages of the invention will become apparent from the details of construction and operation as more fully hereinafter described and claimed. Reference is had to the accompanying drawings forming a part hereof wherein like numerals refer to like parts throughout, and in which:

FIG. 1 is a perspective view of the housed directional signal of the present invention;

FIG. 2 is an enlarged horizontal view taken through the housing of FIG. 1 and illustrating the signalling device;

FIG. 3 is a view of the device taken from the bottom of FIG. 2;

FIG. 5 is an enlarged side elevational view of a typical lamp and a portion of the belt mounting the lamp;

Figure 4:
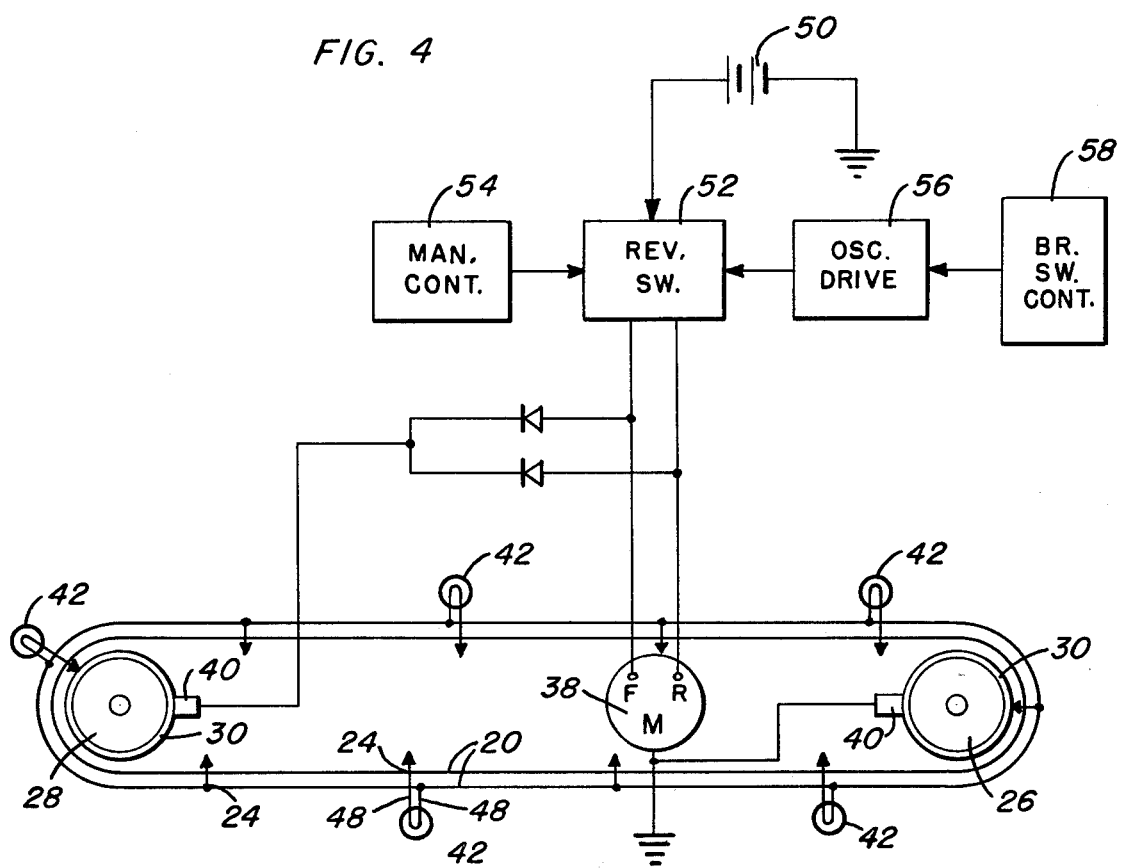
FIG. 4 is a schematic view of the device illustrating the controls and current transfer relationships.

Referring now more specifically to the drawings, reference numeral 10 is used to generally designate the traveling light signal device of the present invention. This device 10 will normally be enclosed within a housing 12 including an opaque base 14 and a red translucent cap 16 through which the traveling lights will be readily and distinctly apparent.

The device 10 includes an elongated endless belt 18 defined by a pair of laterally spaced endless conductor wires 20 within a flexible insulating covering 22.

Externally positioned contacts 24 are provided at equally spaced points on and along the length of the belt 18 with these contacts 24 alternately engaging the conductor wires 20 through the wire covering 22. These contacts 24, as illustrated, can consist of thin conductive wire wrapped about the belt 18.

A pair of pulleys 26 and 28, each provided with a conductive facing 30 of copper or the like, mount the belt 18 thereabout and therebetween. The pulleys 26 and 28 will be relatively remote from each other so as to define a long upper or exposed belt run so as to provide a sufficient light exposure to achieve the desired high visibility. The pulley 26 constitutes the drive pulley and is belt driven by means of an endless belt 32 engaged about a first pulley 34 mounted coaxially and fixed to the primary belt pulley 26, and a second motor driven pulley 36. The drive motor 38 drivingly engaging the pulley 36 is a conventional reversible motor, the significance of which will be explained presently.

Current transferring brushes 40 engage the conductive surfaces 30 on the pulleys 26 and 28. The spacing of the contacts 24 is such whereby only one contact engages each of the pulleys 26 and 28 at one time. In other words, at no time are two contacts engaged with the conductive surface 30 of either pulley. By the same token, there is a simultaneous engagement of one contact 24 with each pulley conductive surface 30 throughout the travel of the belt 18 whereby a current flow is, for all practical purposes, continuous as the belt travels.

Figure 6:
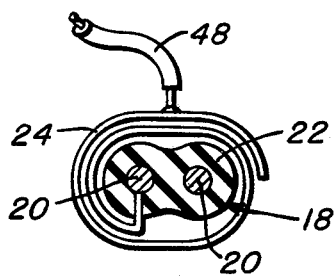
FIG. 6 is a cross-sectional detail taken substantially on a plane passing along line 6—6 in FIG. 3.
Figure 7:
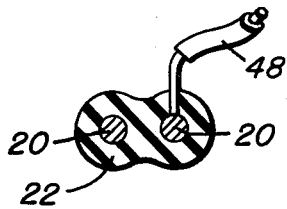
FIG. 7 is a cross-sectional detail taken substantially on a plane passing along line 7—7 in FIG. 3.

A series of electric lamps 42 are each, through an appropriate support 44 and clamp means 46, mounted on the outer face of the conductor wire belt 18 for travel therewith. Each of the lamps 42 has two leads 48 extending to the two conductor wires 20, either directly as detailed in FIG. 7 or through an adjoining contact 24 as illustrated in FIG. 6. In this manner, a lamp illuminating current flow is effected through the individual lamps directly from the lamp supporting belt 18.

In an operational environment, for example when used as a turn signalling means in a motor vehicle, an appropriate source of power, the vehicle battery 50, is provided in conjunction with a conventional reversing switch means 52 operative in response to a manual turn signal control 54 for effecting, at the option of the operator of the vehicle, a driving of the exposed run of the belt 18 to the right or the left by the reversible motor 38. As will be appreciated, completion of the circuit through the switch and to the motor 38 will also complete the circuit to the belt wire 20 and thus effect an illumination of the lamps 42 in conjunction with the driving of the lamp carrying belt 18.

In this particular environment, the operation of the device 10 as a means to signal a braking of the vehicle is also contemplated. Under such circumstances, a conventional oscillating drive 56, responsive to a brake switch control 58 sensing a braking action, can be utilized to cyclically operate switch 52 and achieve a reciprocation of the lamp carrying belt 18. This in turn will provide a highly distinctive signal consisting of plural lights alternately moving left and right. Incidentally, it will be appreciated that the switch 52 also includes an "off" position.

From the foregoing, it will be recognized that the invention herein is generally concerned with the transfer of electrical energy to multiple lamps mounted on a moving belt, in conjunction with means for controlling the movement of the belt. This system has been set forth as finding particular utility in an environment wherein a directional signal is desired, such as for example a turn signal and/or a braking signal utilized in conjunction with vehicles.

The foregoing is considered illustrative of the principles of the invention. However, since numerous modifications and changes may readily occur to those skilled in the art, it is not desired to limit the invention to the exact construction and operation shown and described. Accordingly, all suitable modifications and equivalents may be resorted to, falling within the scope of the invention as claimed.

What is climed claimed new is:

1. A moving light system comprising an endless belt, said belt incorporating a pair of spaced endless conductor wires, lamps mounted on said belt at spaced points therealong and in current receiving engagement with the conductor wires, pulley means mounting said belt for travel thereabout, said pulley means incorporating conductor surfaces, means for supplying electric current to said conductor surfaces, contact means associated with said conductor wires and engageable with the pulley conductor surfaces for the transfer of current to the conductor wires as the belt travels about the pulley means, and means for driving said belt about the pulley means.

2. The system of claim 1 wherein the means for driving said belt comprises a reversible electric motor drivingly engaged with said pulley means, and switch means for controlling the directional operation of the motor.

3. The system of claim 2 wherein the belt includes an insulated cover about said conductor wires, said contact means comprising a series of contacts at equally spaced points along said belt, each contact piercing the cover and engaging with one of the conductor wires therein, each contact overlying the cover for engagement with the conductor surfaces of the pulley means.

4. The system of claim 3 wherein said pulley means comprises a drive pulley and a second pulley remote therefrom whereby two parallel belt runs are defined, each pulley incorporating a conductor surface.

5. The system of claim 4 wherein only one contact engages each pulley conductor surface at one time with the two contacts engaging the two pulley conductor surfaces being in current transferring engagement with opposite ones of the conductor wires.

6. In a signal system for vehicles or the like incorporating a source of electrical energy, a pair of spaced pulleys, an endless belt mounted on said pulleys for travel thereabout, said endless belt incorporating electrical conductor means, a series of lamps mounted at spaced points along said belt and in current receiving communication with the conductor means, cooperative current transferring means for effecting current transfer from said source to said pulleys and from said pulleys to the conductor means of the belt, reversible electric motor means drivingly engaged with one of said pulleys for a selective driving thereof in either direction, switch means for controlling the direction of operation of said motor, and turn signal means for operating said switch means in accordance with the desired direction of movement of the belt.

7. In the system of claim 6, secondary control means for said switch means operably engaged with said first switch means to effect a cyclic operation thereof and a corresponding reciprocating movement of the belt, said secondary control means being operable in response to activation of a conventional vehicle brake system.

8. The system of claim 7 including a housing incorporating the pulley mounted and driven belt with one of said belt runs exposed along the length thereof, and a light passing cover affixed to said housing and exposing said one run therethrough.

* * * * *